(12) United States Patent
Yamashita

(10) Patent No.: US 7,685,284 B2
(45) Date of Patent: Mar. 23, 2010

(54) NETWORK, NETWORK TERMINAL DEVICE, IP ADDRESS MANAGEMENT METHOD USING THE SAME, AND PROGRAM THEREFOR

(75) Inventor: Tetsuya Yamashita, Tokyo (JP)

(73) Assignee: NEC Corporation, Tokyo (JP)

( * ) Notice: Subject to any disclaimer, the term of this patent is extended or adjusted under 35 U.S.C. 154(b) by 1077 days.

(21) Appl. No.: 11/345,340

(22) Filed: Feb. 2, 2006

(65) Prior Publication Data

US 2006/0173988 A1     Aug. 3, 2006

(30) Foreign Application Priority Data

Feb. 2, 2005   (JP)   ............... 2005-025787

(51) Int. Cl.
*G06F 15/173*   (2006.01)
*G06F 15/177*   (2006.01)
(52) U.S. Cl. .................. 709/226; 709/223; 709/224; 709/225; 709/229
(58) Field of Classification Search ............ 709/219, 709/223, 224, 225, 226, 227
See application file for complete search history.

(56) References Cited

U.S. PATENT DOCUMENTS

| | | | |
|---|---|---|---|
| 5,949,753 A | | 9/1999 | Alexander et al. |
| 6,247,055 B1 * | | 6/2001 | Cotner et al. ............... 709/227 |
| 6,957,262 B2 * | | 10/2005 | Kimura et al. .............. 709/227 |
| 7,085,814 B1 * | | 8/2006 | Gandhi et al. ............... 709/208 |
| 7,328,266 B2 * | | 2/2008 | Schmidt et al. ............. 709/227 |
| 7,529,810 B2 * | | 5/2009 | Goto et al. .................. 709/219 |
| 2002/0133595 A1 * | | 9/2002 | Kimura et al. .............. 709/227 |
| 2002/0141352 A1 | | 10/2002 | Fangman |
| 2003/0035414 A1 | | 2/2003 | Beyda |
| 2003/0088683 A1 * | | 5/2003 | Kitamura et al. ............ 709/230 |
| 2003/0105841 A1 * | | 6/2003 | Miyake et al. .............. 709/220 |
| 2003/0123463 A1 | | 7/2003 | Yoshida |
| 2003/0177236 A1 * | | 9/2003 | Goto et al. .................. 709/225 |

(Continued)

FOREIGN PATENT DOCUMENTS

JP         10-150469         6/1998

(Continued)

OTHER PUBLICATIONS

R. Droms; "Dynamic Host Configuration Protocol"; Network Working Group; Bucknell University; Mar. 1997; pp. 1-11.

(Continued)

*Primary Examiner*—Quang N. Nguyen
*Assistant Examiner*—Razu A Miah
(74) *Attorney, Agent, or Firm*—Whitham Curtis Christofferson & Cook, PC

(57) ABSTRACT

When a communication malfunction occurs in the transmission line between routers, and operation is carried out by a backup system control device, IP telephone terminals can connect to the backup system control device through the use of an IP address that is previously acquired from the address management device and saved. When the transmission line has been restored, the IP telephone terminals reconnect to the address management device so that operation can be carried out using an IP address under the control of the address management device. In a system that is operated by DHCP, it is thereby possible to construct a network that can be operated without installing a DHCP server at each remote station.

24 Claims, 10 Drawing Sheets

U.S. PATENT DOCUMENTS

| | | |
|---|---|---|
| 2004/0037219 A1 | 2/2004 | Shaffer et al. |
| 2005/0055575 A1* | 3/2005 | Evans et al. ................. 713/201 |
| 2006/0047788 A1* | 3/2006 | Sakai ......................... 709/220 |

FOREIGN PATENT DOCUMENTS

| | | |
|---|---|---|
| JP | 2001-189761 | 7/2001 |
| JP | 2003 069602 | 3/2003 |
| JP | 2003 228527 | 8/2003 |
| JP | 2006 361259 | 6/2006 |
| WO | WO 01/95564 A2 | 12/2001 |
| WO | WO 2004/038979 A2 | 5/2004 |
| WO | WO 2004/038979 A3 | 5/2004 |

OTHER PUBLICATIONS

Japanese Office Action with English translations.

* cited by examiner

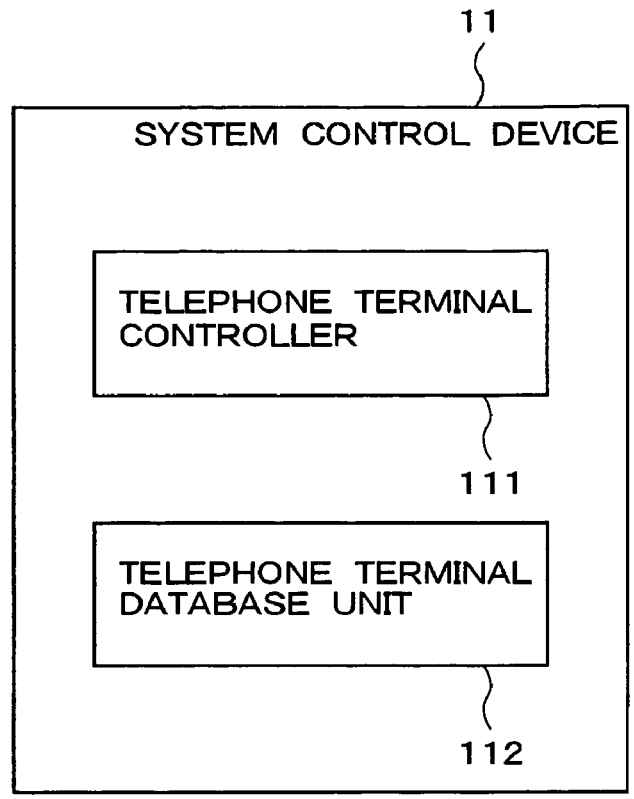

122 IP ADDRESS DATABASE UNIT

| IP ADDRESS | STATUS | MAC ADDRESS |
|---|---|---|
| 100. 100. 100. 100 | USED | xx-xxxx-00-00-00 |
| 100. 100. 100. 101 | USED | xx-xxxx-00-00-01 |
| 100. 100. 100. 102 | USED | xx-xxxx-00-00-02 |
| 100. 100. 100. 103 | USED | xx-xxxx-00-00-03 |
| 100. 100. 100. 104 | USED | xx-xxxx-00-00-04 |
| 100. 100. 100. 105 | USED | xx-xxxx-00-00-05 |
| 100. 100. 100. 106 | UNUSED | |
| 100. 100. 100. 107 | UNUSED | |

INITIAL REGISTRATION SEQUENCE

NETWORK, NETWORK TERMINAL DEVICE, IP ADDRESS MANAGEMENT METHOD USING THE SAME, AND PROGRAM THEREFOR

BACKGROUND OF THE INVENTION

1. Field of the Invention

The present invention relates to a network, a network terminal device, an IP address management method using the same, and a program therefor, and more particularly relates to a system that enables IP telephones and other terminals to connect to a LAN (Local Area Network) in a remote environment using DHCP (Dynamic Host Configuration Protocol).

2. Description of the Related Art

In a conventional network system that includes a network terminal such as an IP telephone, operation using DHCP is not implemented in networks in which backup system control devices are used.

In this case, DHCP is an arrangement for dynamically providing host-setting information in the TCP/IP (Transmission Control Protocol/Internet Protocol) network, and can, on the basis of the BOOTP (Bootstrap Protocol), dynamically provide time-limited IP addresses from the DHCP server to a client (Refer to "Dynamic Host Configuration Protocol 3 The Client-Server Protocol" [RFC (Request For Comments: 2131, March 1997, Page 13 to 22)], for example).

An example of operation in a remote location in which DHCP is used is a system that can acquire an address by DHCP even with a user terminal device installed in a remote location (Japanese Patent Application Kokai Publication No. 2001-189761, for example). In this first prior art, a user terminal device is connected to a remote access server apparatus via a dialup server unit. The dialup server unit responds to an incoming transmission from the user terminal device and then sends to an authentication server the user identifier and password received from the user terminal device. The authentication server authenticates the identifier and password, after which the DHCP message transmission unit is instructed to acquire an address by way of a network host address interrupt request from the user terminal device, and the DHCP message transmission unit acquires a network host address and notifies the user terminal via the dialup server unit.

An example of operation in which a backup system control device is used is a system which can operate during malfunctions by providing a backup switching device (Japanese Patent Application Kokai Publication No. 10-15046, for example). In the second prior art, a device having a plurality of frame relay switchers is provided for transferring the stored position information of the communication remote terminal to a backup frame relay switcher and making a backup connection when a circuit malfunctions in a frame relay network that communicates by a remote fixed connection. The back frame relay switcher makes a backup connection to a terminal by way of a backup circuit on the basis of the stored position information.

However, when an attempt is made to connect an IP telephone or another terminal to a LAN in a remote environment by using DHCP, the time limit of the IP address that the telephone terminal previously acquired from the DHCP server must be updated before the time limit elapses. Nevertheless, in the conventional network described above, when a malfunction occurs in the transmission line between the DHCP server and a telephone terminal equipped with a DHCP client function, the usable IP address information is no longer available because the telephone terminal can no longer carry out the update routine for updating the IP address time limit. As a result, there is a problem in that a connection can no longer be made to the system control device installed as a backup. For this reason, operation using DHCP cannot be carried out in a network in which a backup system control device is used in a network system having a network terminal such as an IP telephone.

SUMMARY OF THE INVENTION

An object of the present invention is to provide a network, a network terminal device, an IP address management method using the same, and a program therefor that can operate without the installation of a DHCP server at each remote station in a system operating with DHCP.

The network according to the first aspect of the present invention has: a plurality of network terminal devices; first and second system control devices which can control each of said plurality of network terminal devices; and an address management device for managing IP (Internet Protocol) addresses of said plurality of network terminal devices. Said first system control device and said address management device are connected to a first station. And said second system control device and said plurality of network terminal devices are connected to a second station. Each of said plurality of network terminal devices is connected to and operated by said first system control device or said second system control device. Each of said network terminal devices has a storage unit for storing an IP address acquired from said address management device, and a management unit for using the IP address stored in said storage unit when a malfunction has occurred in the connection between said first station and said second station, and re-registering the address in the system control device to which that network terminal devices are connected.

The network according to the second aspect of the present invention has: a plurality of network terminal devices; a system control device which can control each of said plurality of network terminal devices; a backup system control device which can control each of said plurality of network terminal devices; an address management device for managing IP (Internet Protocol) addresses of said plurality of network terminal devices; an intrastation transmission line to which said system control device and said address management device are connected, thereby constituting a first station; a LAN (Local Area Network) to which said network terminal devices and said backup system control device are connected, thereby constituting a second station; and an interstation transmission line for connecting said first station and said second station by way of a router. Said network terminal devices are ordinarily connected to and operated by said system control device. Each of said network terminal devices has a storage unit for storing an IP address acquired from said address management device, and a management unit for using the IP address stored in said storage unit when a malfunction has occurred in the interstation transmission line between said first station and said second station, and re-registering the address in the backup system control device. And said network terminal devices are connected to and operated by said backup system control device when said malfunction has occurred in said interstation transmission line.

The network according to the third aspect of the present invention has: a plurality of network terminal devices; first and second system control devices which can control each of said plurality of network terminal devices; an address management device for managing IP (Internet Protocol) addresses of said plurality of network terminal devices; an intrastation transmission line to which said first system control device and said address management device are connected, thereby constituting a first station; a LAN (Local Area Network) to which said network terminal devices and said second system control device are connected, thereby constituting a second station; and an interstation transmission line for connecting said first station and said second station by way of a router. said network terminal devices are connected to and operated by said first system control device or said second system control device. Each of said network terminal devices has a storage unit for storing an IP address acquired from said address management device, and a management unit for using the IP address stored in said storage unit when a malfunction has occurred in the interstation transmission line connected between said first station and said second station, and re-registering the address in the second system control device. And network terminal devices which belongs to the second station and which have been connected to and operated by said first system control device prior to the occurrence of said malfunction are made connected to and operated by said second system control device after the occurrence of the malfunction when the malfunction has occurred in said interstation transmission line.

The network terminal device according to the fourth aspect of the present invention is a network terminal device of a network which is controlled by first and second system control devices, in which the IP (Internet Protocol) address thereof is managed by an address management device, wherein said network has a first station to which said first system control device and said address management device are connected, and a second station to which said second system control device and said network terminal devices are connected. Said network terminal device is operated by said first system control device or said second system control device; and each of said network terminal device has a storage unit for storing an IP address acquired from said address management device, and a management unit for using the IP address stored in said storage unit when a malfunction has occurred in the connection between said first station and said second station, and re-registering the address in the system control device to which the network terminal device is connected.

The network terminal devices of the fifth aspect of the present invention is a network terminal device of a network which is controlled by a system control device and a backup system control device, in which the IP (Internet Protocol) address thereof is managed by an address management device, wherein said network has a first station to which said system control device and said address management device are connected, a second station to which said backup system control device and said network terminal devices are connected, and an interstation transmission line for connecting said first station and said second station by way of a router. Each of said network terminal devices has a storage unit for storing an IP address acquired from said address management device, and a management unit for using the IP address stored in said storage unit when a malfunction has occurred in the interstation transmission line that connects said first station and said second station, and re-registering the address in the backup system control device. Said network terminal devices are ordinarily connected to and operated by said system control device, and are connected to and operated by said backup system control device when a malfunction has occurred in the interstation transmission line.

The network terminal devices of the sixth aspect of the present invention is a network terminal device of a network which is controlled by first and second system control devices, in which the IP (Internet Protocol) address thereof is managed by an address management device, wherein said network has a first station to which said first system control device and said address management device are connected, a second station to which said second system control device and said network terminal device are connected, and an interstation transmission line for connecting said first station and said second station by way of a router. Each of said network terminal device has a storage unit for storing an IP address acquired from said address management unit, and a management unit for using the IP address stored in said storage unit when a malfunction has occurred in the interstation transmission line that connects said first station and said second station, and re-registering the address in the second system control device. Said network terminal devices are connected to and operated by said first system control device or said second system control device, and when said malfunction has occurred in the interstation transmission line, network terminal devices which belongs to the second station and which was connected to and operated by said first system control device prior to the malfunction occurrence are made connected to and operated by said second system control device after the malfunction has occurred.

The IP address management method of the seventh aspect of the present invention is a method used in a network comprising: a plurality of network terminal devices; first and second system control devices which can control each of said plurality of network terminal devices; and an address management device for managing IP (Internet Protocol) addresses of said plurality of network terminal devices, wherein said first system control device and said address management device are connected to a first station; said second system control device and said plurality of network terminal devices are connected to a second station; and each of said plurality of network terminal devices is connected to and operated by said first system control device or said second system control device. Said method comprises: storing an IP address acquired from said address management device in the storage unit of said network terminal devices; and using the IP address stored in said storage unit when a malfunction has occurred in the connection between said first and second stations, and re-registering the address in the system control device to which the network terminal devices are connected.

The IP address management method of the eighth aspect of the present invention is a method used in a network comprising: a plurality of network terminal devices; a system control device which can control each of said plurality of network terminal devices; a backup system control device which can control each of said plurality of network terminal devices; an address management device for managing IP (Internet Protocol) addresses of said plurality of network terminal devices; an intrastation transmission line to which said system control device and said address management device are connected, thereby constituting a first station; a LAN (Local Area Network) to which said network terminal devices and said backup system control device are connected, thereby constituting a second station; and an interstation transmission line for connecting said first station and said second station by way of a router. Said method comprises: storing an IP address acquired from said address management device in the storage unit of said network terminal devices; and using the IP address stored in said storage unit when a malfunction has occurred in the interstation transmission line, and re-registering the address in said backup system control device, wherein said network terminal devices are thereby ordinarily connected to and operated by said system control device, and said network terminal devices are connected to and operated by said backup system control device when said malfunction has occurred in said interstation transmission line.

The IP address management method of the ninth aspect of the present invention is a method used in a network comprising: a plurality of network terminal devices; first and second system control devices which can control each of said plurality of network terminal devices; an address management device for managing IP (Internet Protocol) addresses of said plurality of network terminal devices; an intrastation transmission line to which said first system control device and said address management device are connected, thereby constituting a first station; a LAN (Local Area Network) to which said network terminal devices and said second system control device are connected, thereby constituting a second station; and an interstation transmission line for connecting said first station and said second station by way of a router. Said method comprises: storing an IP address acquired from said address management device in the storage unit of said network terminal devices; and using the IP address stored in said storage unit when a malfunction has occurred in the interstation transmission line, and re-registering the address in said second system control device, wherein said network terminal devices are thereby ordinarily connected to and operated by said first system control device or second system control device, and network terminal devices which belongs to the second station and which were connected to and operated by said first system control device prior to the occurrence of said malfunction are made connected to and operated by said second system control device after the occurrence of the malfunction when the malfunction has occurred in said interstation transmission line.

The program according to the tenth aspect is a program of the IP address management method used in a network comprising: a plurality of network terminal devices; first and second system control devices which can control each of said plurality of network terminal devices; and an address management device for managing IP (Internet Protocol) addresses of said plurality of network terminal devices, wherein said first system control device and said address management device are connected to a first station; said second system control device and said plurality of network terminal devices are connected to a second station; and each of said plurality of network terminal devices is connected to and operated by said first system control device or said second system control device. Said program executes: storing an IP address acquired from said address management device in a storage unit in the computers of said plurality of network terminal devices; and using the IP address of said storage unit when a malfunction has occurred in the transmission line between the first and second stations, and re-registering the address in the system control device to which the network terminal devices are connected.

The program according to the eleventh aspect is a program of the IP address management method used in a network comprising: a plurality of network terminal devices; a system control device for controlling each of said plurality of network terminal devices; a backup system control device for controlling each of said plurality of network terminal devices; an address management device for managing IP (Internet Protocol) addresses of said plurality of network terminal devices; an intrastation transmission line to which said system control device and said address management device are connected, thereby constituting a first station; a LAN (Local Area Network) to which said network terminal devices and said backup system control device are connected, thereby constituting a second station; and an interstation transmission line for connecting said first station and said second station by way of a router. Said program executes: storing an IP address acquired from said address management device in a storage unit in the computers of said plurality of network terminal devices; and using the IP address of said storage unit when a malfunction has occurred in the interstation transmission line, and re-registering the address in the backup system control device.

The program according to the twelfth aspect is a program of the IP address management method used in a network comprising: a plurality of network terminal devices; first and second system control devices which can control each of said plurality of network terminal devices; an address management device for managing IP (Internet Protocol) addresses of said plurality of network terminal devices; an intrastation transmission line to which said first system control device and said address management device are connected, thereby constituting a first station; a LAN (Local Area Network) to which said network terminal devices and said second system control device are connected, thereby constituting a second station; and an interstation transmission line for connecting said first station and said second station by way of a router. Said program executes: storing an IP address acquired from said address management device in a storage unit in the computers of said plurality of network terminal devices; and using the IP address of said storage unit when a malfunction has occurred in the interstation transmission line, and re-registering the address in the second system control device.

The network of the present invention implements an IP (Internet Protocol) telephone terminal function that can connect to a LAN (Local Area Network) in a remote environment in which a DHCP (Dynamic Host Configuration Protocol) is used.

More specifically, in the network of the present invention, when a communication malfunction occurs in the connection between the main and remote stations (transmission line between the main and remote stations is cut, for example), IP telephone terminals cannot connect to the address management device due to a malfunction in the transmission line when operation is carried out using a backup system control device, and when an IP address cannot be acquired, the IP telephone terminal can connect to a backup system control device, and operation within a remote station, which is a closed network, is enabled by the use of the IP address acquired from the previous address management device.

In the network of the present invention, the IP telephone terminal can acquire an IP address from the address management device under the control of the address management device by reconnecting the IP telephone terminal to the address management device when the transmission line is restored. Operation can therefore be carried out at remote stations by using the IP address.

As described above, in the network of the present invention, IP telephone terminals use saved IP addresses and can connect to a backup system control device disposed in remote stations. Operation is therefore possible without the installation of a DHCP server at each remote station, even if a malfunction occurs in the connection between the main and remote stations, as a result of the fact that IP addresses acquired from the previous address management device are stored in the IP telephone terminals.

In this case, the DHCP can dynamically provide a time-limited IP address from the DHCP server to the client on the basis of BOOTP (Bootstrap Protocol) in a mechanism for dynamically providing host-setting information in a TCP/IP (Transmission Control Protocol/Internet Protocol) network.

In the network of the present invention, since a DHCP server for dynamically providing time-limited IP addresses is installed only in the main station, it is possible to manage the IP addresses of both the main and remote stations by using a single DHCP server, and IP addresses can be uniformly managed.

As described above, in a system operated by DHCP in accordance with the present invention, an effect can be obtained in that the operation can be carried out without installing a DHCP server in each remote station.

BRIEF DESCRIPTION OF THE DRAWINGS

FIG. 2 is a block diagram showing the configuration of the system control device of FIG. 1;

FIG. 3 is a diagram showing the configuration of the telephone terminal database unit of FIG. 2;

DETAILED DESCRIPTION OF THE PREFERRED EMBODIMENTS

Figure 1:
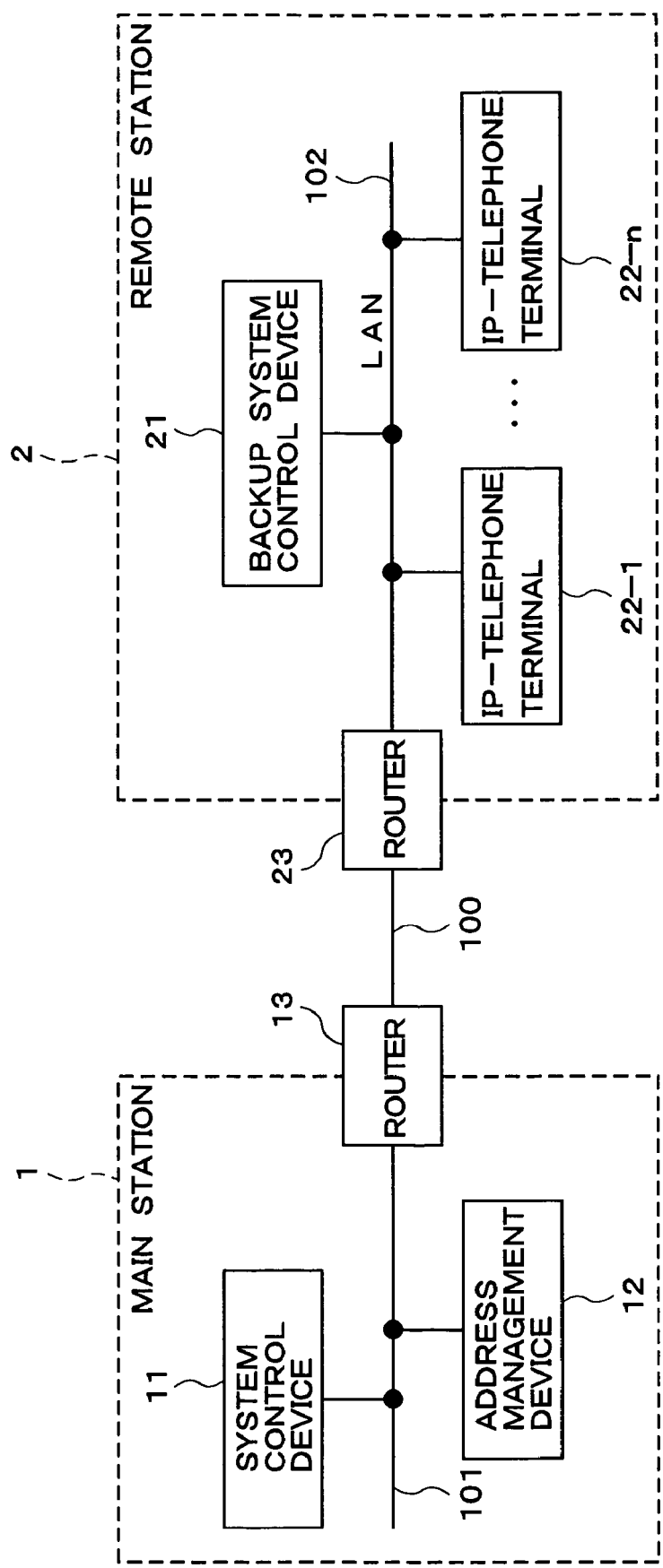
FIG. 1 is a block diagram showing the network configuration of the first embodiment of the present invention.

Preferred embodiments of the present invention are described below with reference to the accompanying diagrams. FIG. 1 is a block diagram showing the network configuration of the first embodiment of the present invention. FIG. 1 shows a system configuration having an IP telephone terminal that can be connected to a LAN (Local Area Network) in a remote environment that operates using DHCP (Dynamic Host Configuration Protocol).

In FIG. 1, the network according to the first embodiment of the present invention has a main station 1 and remote station 2. The main station 1 has a system control device 11, an address management device 12, and a router 13; and the system control device 11, address management device 12, and router 13 are mutually connected by way of a transmission line 101.

The remote station 2 has a backup system control device 21, IP (Internet Protocol) telephone terminals 22-1 to 22-*n* that are connectable to a LAN, and a router 23. The backup system control device 21, the IP telephone terminals 22-1 to 22-*n*, and the router 23 are mutually connected by a LAN 102. The main station 1 and remote station 2 are connected via a transmission line 100 by way of routers 13 and 23.

The system control device 11 and backup system control device 21 control the IP telephone terminals 22-1 to 22-*n*, and the address management device 12 manages the IP addresses of the IP telephone terminals 22-1 to 22-*n*. The network according to an embodiment of the present invention is separated into a main station 1 and remote station 2 by way of routers 13 and 23. An example of the system control device 11 and backup system control device 21 is a PBX (Private Branch exchange).

When a communication malfunction occurs in the transmission line 100 between the router 13 and 23 (between the main station 1 and remote station 2) and the remote station 2 is operated by a backup system control device 21, a connection cannot be made to the address management device 12 and an IP address cannot be acquired because the IP telephone terminals 22-1 to 22-*n* experience a communication malfunction in the transmission line 100. In this case, the IP telephone terminals 22-1 to 22-*n* can connect to the backup system control device 21 and operation in the remote station 2 is made possible because the saved IP address acquired from a previous address management device 12 is used.

When the transmission line 100 has been restored, the IP telephone terminals 22-1 to 22-*n* can acquire an IP address from the address management device 12 because the IP telephone terminals 22-1 to 22-*n* reconnect to the address management device 12. The remote station 2 can therefore be operated using this IP address.

FIG. 2 is a block diagram showing the configuration of the system control device 11 of FIG. 1. In FIG. 2, the system control device 11 is provided with a telephone terminal controller 111 and a telephone terminal database unit 112.

The telephone terminal controller 111 carries out registration routines and telephone control procedures for the IP telephone terminals 22-1 to 22-*n*, and stores in the telephone terminal database unit 112 the IP address provided by the IP telephone terminals 22-1 to 22-*n* during registration, and the telephone numbers for the IP telephone terminals 22-1 to 22-*n*. The configuration of the backup system control device 21 is the same configuration as the system control device 11 described above, although this is not depicted in the diagram.

FIG. 3 is a diagram showing the configuration of the telephone terminal database unit 112 of FIG. 2. In FIG. 3, the telephone terminal database unit 112 holds the IP addresses ("100.100.100.100", "100.100.100.101", "100.100.100.102", "100.100.100.103", "100.100.100.104", and "100.100.100.105") that the IP telephone terminals 22-1 to 22-*n* have provided during registration to the system control device 11 and backup system control device 21, and the telephone number information ("200", "201", "202", "203", "204", and "205") assigned to the IP telephone terminals 22-1 to 22-*n*.

Figures 4, 5:
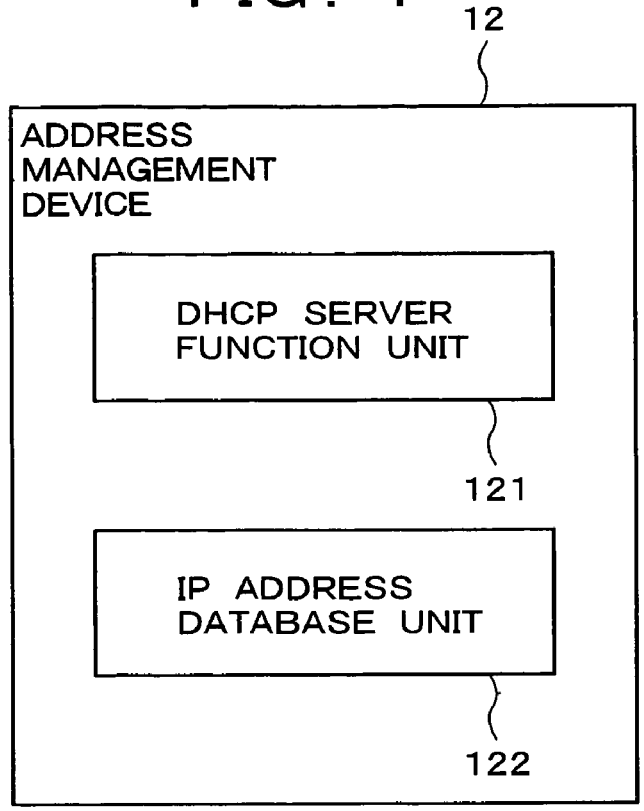
FIG. 4 is a block diagram showing the configuration of the address management device of FIG. 2.
FIG. 5 is a diagram showing the configuration of the IP address database unit of FIG. 4.

FIG. 4 is a block diagram showing the configuration of the address management device 12 of FIG. 2. In FIG. 4, the address management device 12 is provided with a DHCP server function unit 121 and an IP address database unit 122. In the DHCP server function unit 121, an unused IP address is assigned to the IP address database unit 122 in response to an IP address request from the DHCP client function unit 222 contained in the hereinbelow-described IP telephone terminals 22-1 to 22-*n*.

FIG. 5 is a diagram showing the configuration of the IP address database unit 112 of FIG. 4. In FIG. 5, the IP address database unit 122 holds the IP addresses ("100.100.100.100", "100.100.100.101", "100.100.100.102", "100.100.100.103", "100.100.100.104", "100.100.100.105", "100.100.100.106", and "100.100.100.107") retained by the address management device 12, the assigned state (usage state) thereof ("used" or "unused"), and the MAC (Media Access Control) addresses ("xx-xx-xx-00-00-00", "xx-xx-xx-00-00-01", "xx-xx-xx-00-00-02", "xx-xx-xx-00-00-03", "xx-xx-xx-00-00-04", and "xx-xx-xx-00-00-05").

Figure 6:
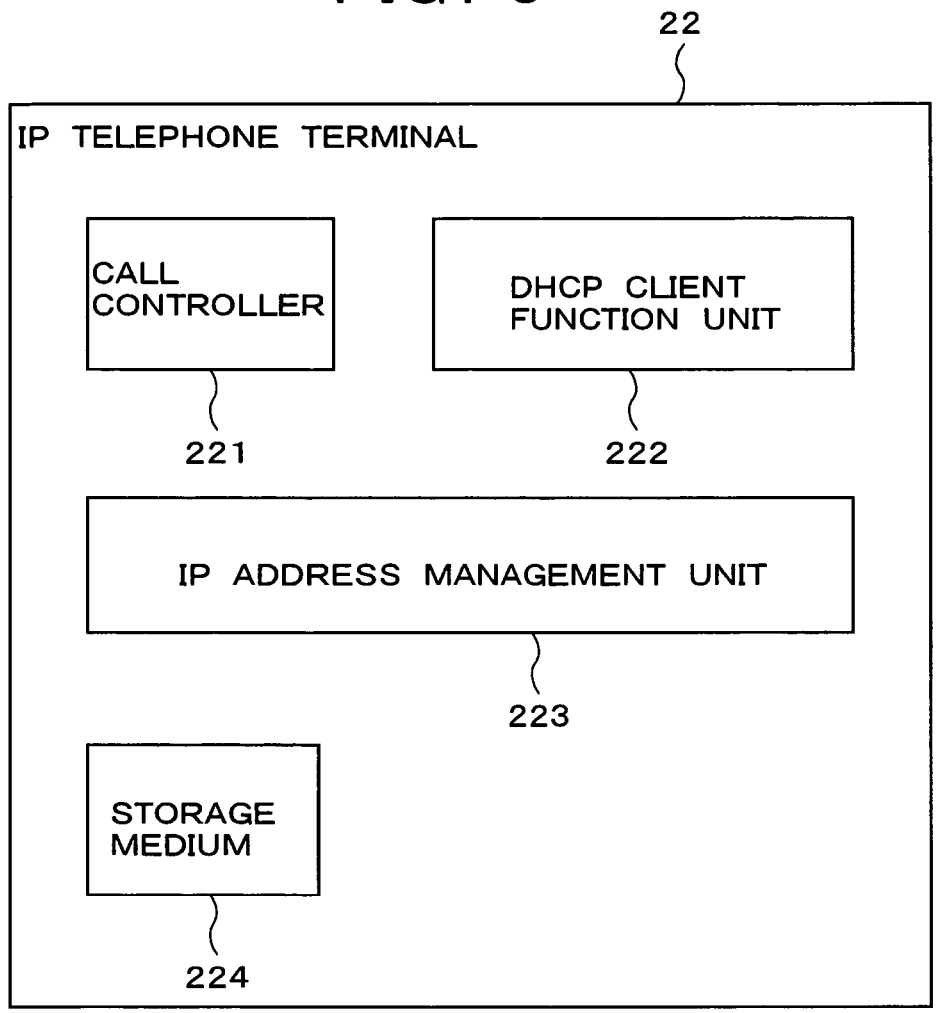
FIG. 6 is a block diagram showing the configuration of the IP telephone terminal of FIG. 1.

FIG. 6 is a block diagram showing the configuration of the IP telephone terminal 22 of FIG. 1. In FIG. 6, the IP telephone terminals 22 (22-1 to 22-n) are provided with a call controller 221, a DHCP client function unit 222, an IP address management unit 223, and a storage medium 224 for storing programs that are executed by the CPU (Central Processing Unit; not shown) for implementing the routines of the above-described components. The IP telephone terminals 22-1 to 22-n have the same configuration as the IP telephone terminal 22 described above, although this is not depicted in the diagram.

Figure 7:
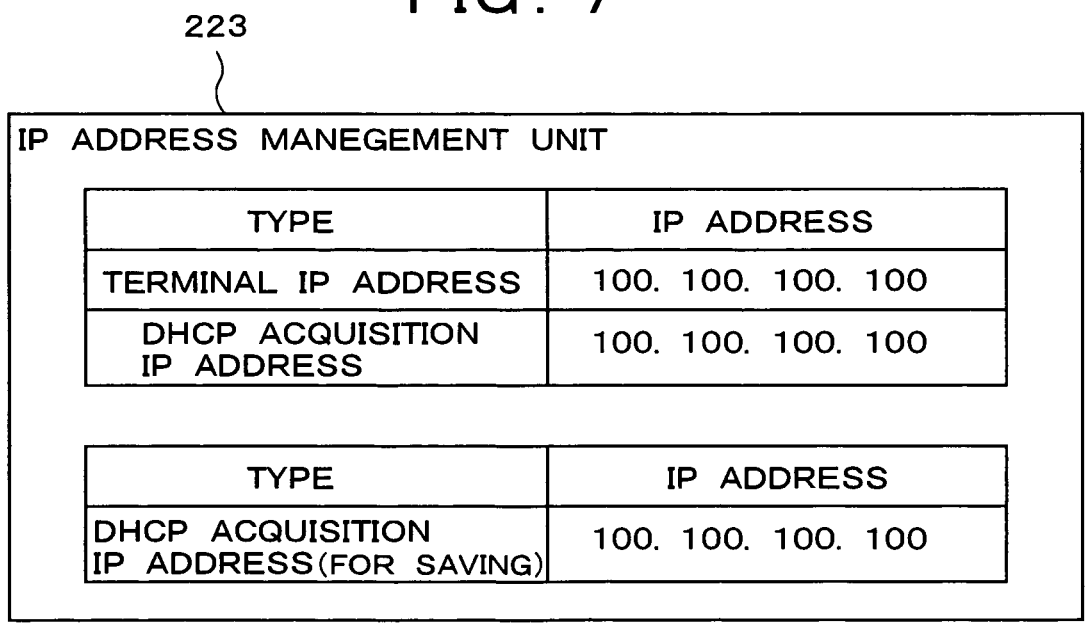
FIG. 7 is a diagram showing the configuration of the IP address management unit of FIG. 6.

FIG. 7 is a diagram showing the configuration of the IP address management unit 223 of FIG. 6. In the IP address management unit 223 in FIG. 7, the IP address ("100.100.100.100") used for operation and the IP address ("100.100.100.100") acquired from the address management device 12 in the DHCP are saved in RAM (Random Access Memory), and the DHCP-acquired IP address ("100.100.100.100") for saving is saved in FROM (Flash EEPROM: Electrically Erasable and Programmable Read Only Memory).

The IP address management unit 223 receives a re-register request instruction from the system control device 11 or the backup system control device 21, and when initialization is carried out, the terminal IP address and DHCP-acquired IP address are cleared, and only the DHCP-acquired IP address for saving remains saved.

Figure 8:
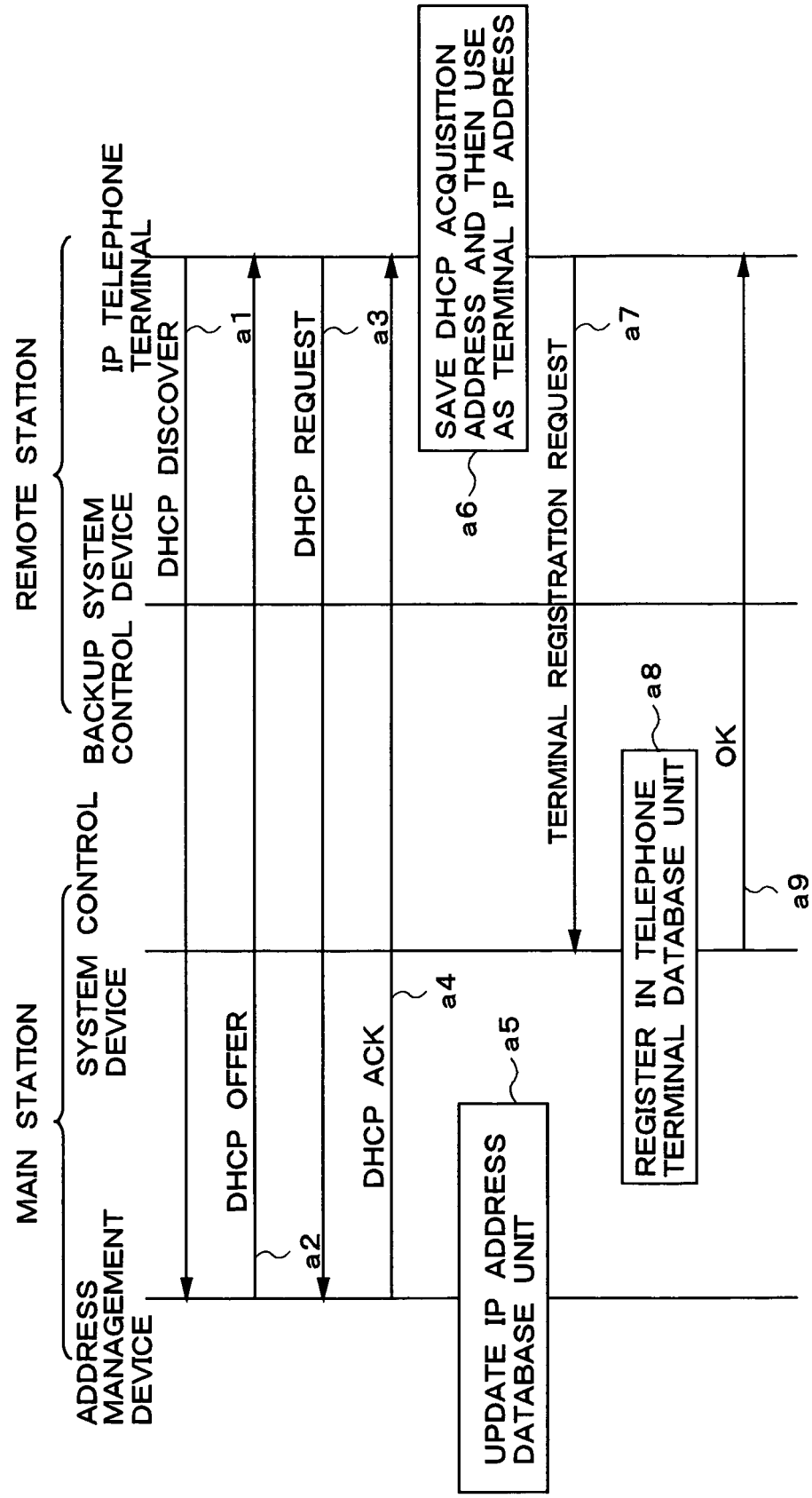
FIG. 8 is a sequence chart showing the operation of IP address management in the network of an embodiment of the present invention.
Figure 9:
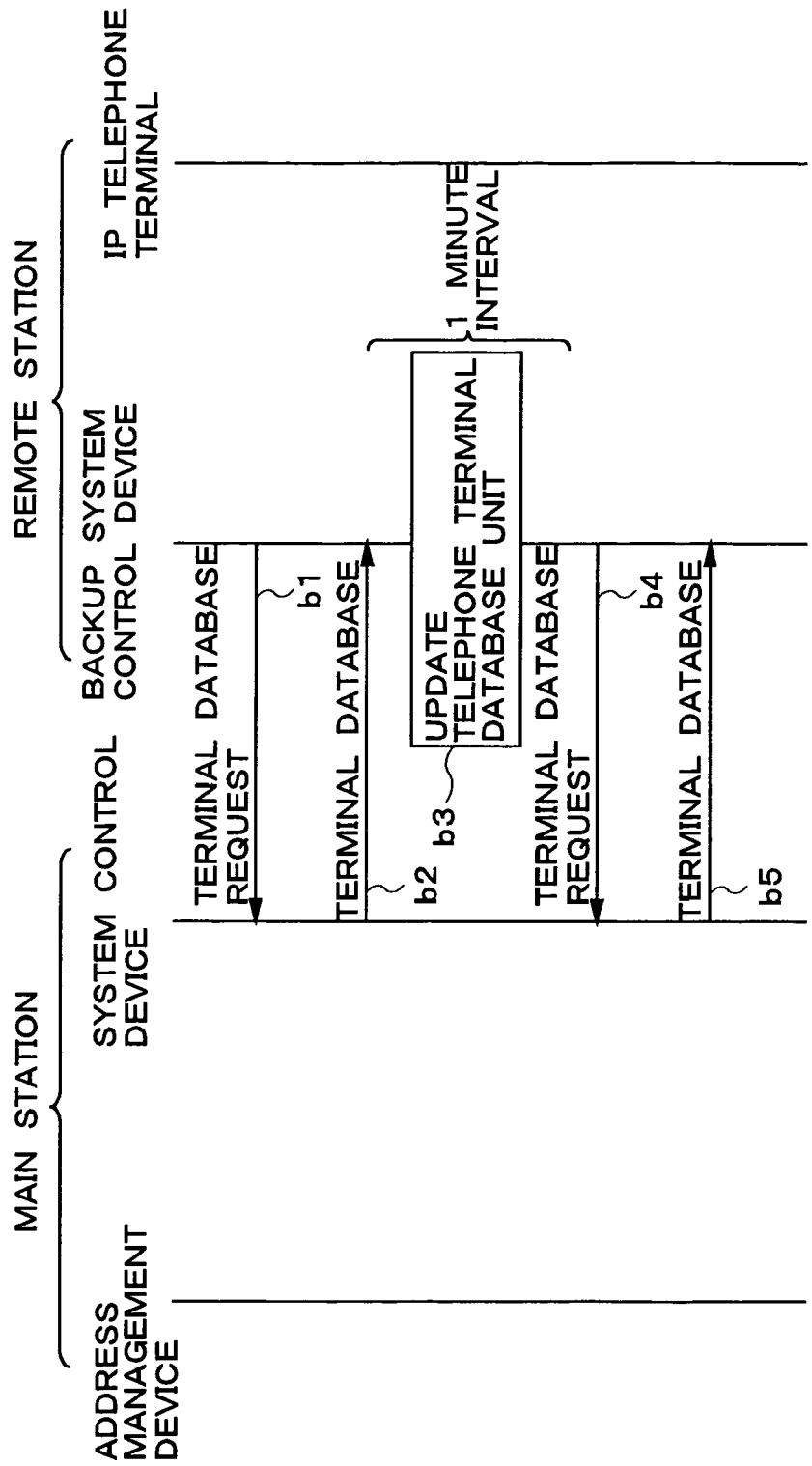
FIG. 9 sequence chart showing the operation of the IP address management in the network of an embodiment of the present invention.
Figure 10:
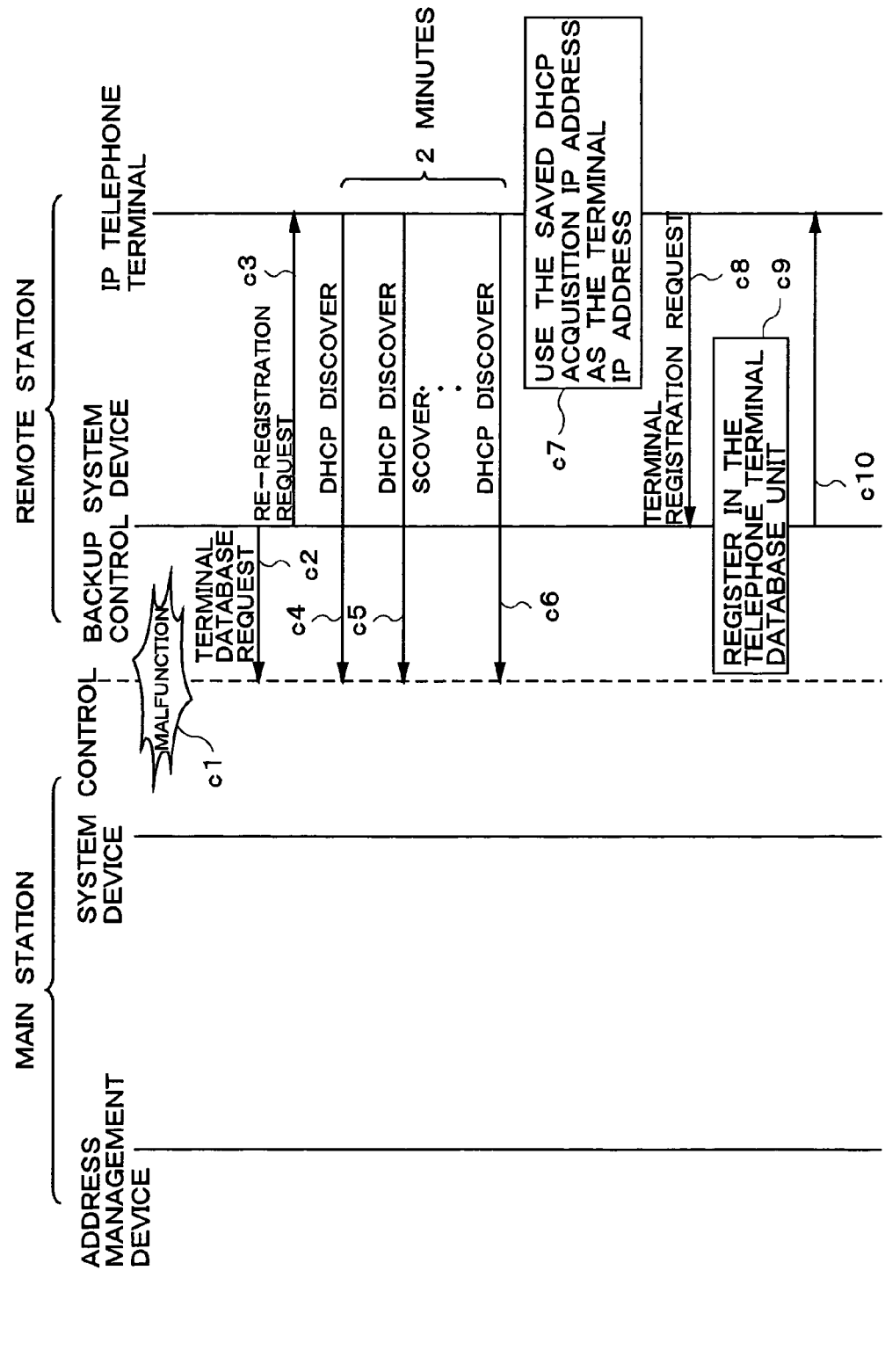
FIG. 10 sequence chart showing the operation of the IP address management in the network of an embodiment of the present invention.
Figure 11:
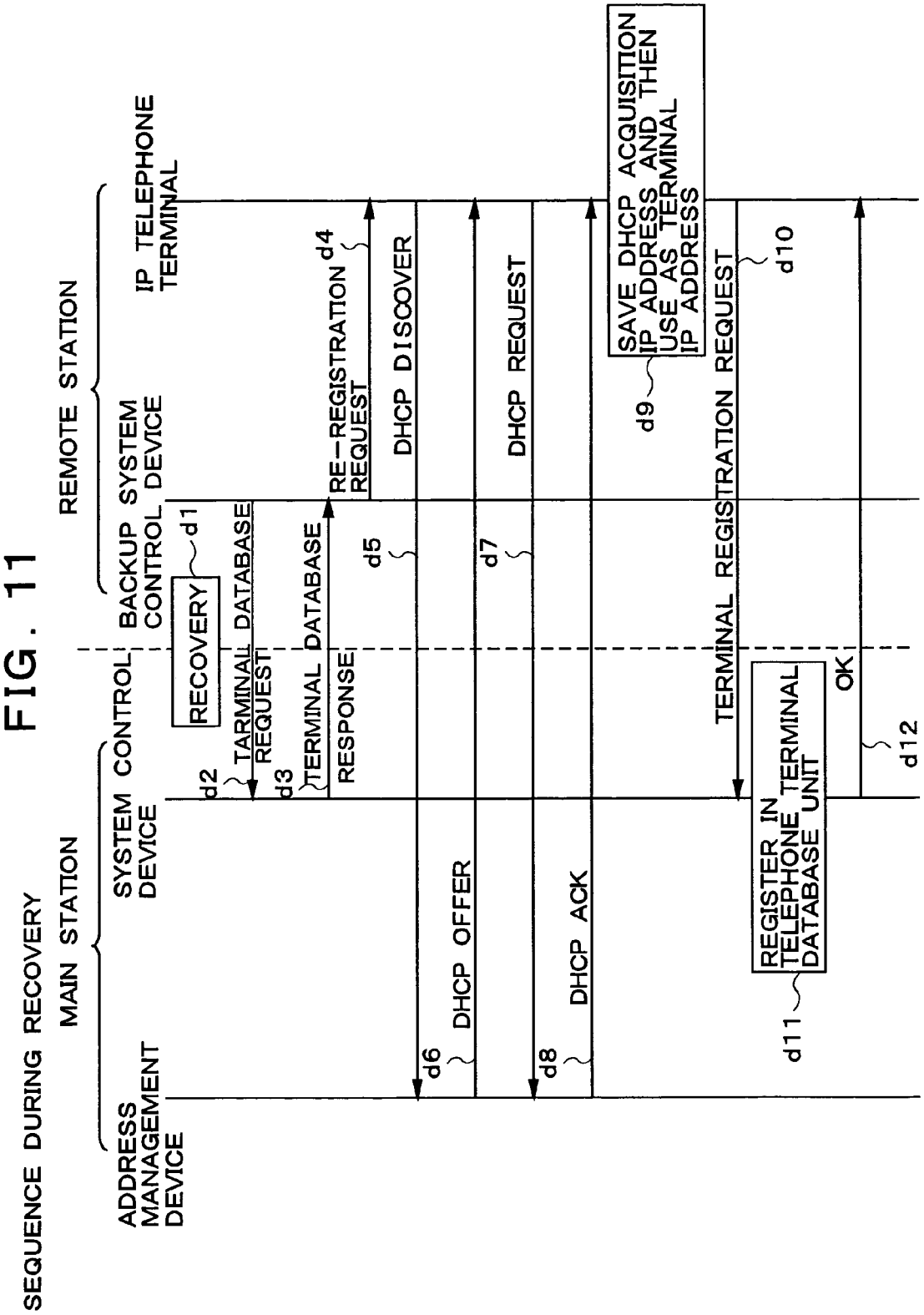
FIG. 11 sequence chart showing the operation of the IP address management in the network of an embodiment of the present invention.

FIGS. 8 to 11 are sequence charts showing the operation of IP address management in the network of the first embodiment of the present invention. The operation of IP address management in the network of the first embodiment of the present invention is described below with reference to FIGS. 1 to 11. The routines of the IP telephone terminals 22-1 to 22-n in FIGS. 8, 10, and 11 are implemented by the CPU in the IP telephone terminals 22-1 to 22-n, which executes the programs in the storage medium 224.

When the system control device 11 and address management device 12 connect to the main station 1 and the backup system control device 21 and IP telephone terminals 22-1 to 22-n connect to the remote station 2 to begin operation, the IP telephone terminals 22-1 to 22-n first use the DHCP in the address management device 12 to request their own terminal IP address (a1 to a4 in FIG. 8).

When the IP telephone terminals 22-1 to 22-n acquire an IP address from the address management device 12, the DHCP-acquired IP address of the IP address management unit 223 is saved in the RAM and is then also copied to the terminal IP address. The IP telephone terminals 22-1 to 22-n save the DHCP-acquired IP address in the DHCP-acquired IP address field for saving of the FROM (a6 in FIG. 8). The address management device 12 updates the IP address database unit 122 at this time (a5 in FIG. 8).

The IP telephone terminals 22-1 to 22-n notify the system control device 11 of a terminal registration request (a7 in FIG. 8). In the system control device 11, which has received the notification, operation at a remote station is initiated by registering the request in the telephone terminal database unit 112 (a8 in FIG. 8), returning an OK (a9 in FIG. 8), and completing the registration.

Since the backup system control device 21 shares with the system control device 11 information contained in the telephone terminal database unit 112, a database request is periodically (1-minute intervals, for example) sent to the system control device 11. Having received the request, the system control device 11 provides the data of the telephone terminal database unit 112 to the backup system control device 21 (b1, b2, b4, and b5 in FIG. 9).

The backup system control device 21 updates the telephone terminal database unit 112 with the data from the system control device 11 (b3 in FIG. 9). From the viewpoint of the backup system control device 21, this can be seen as a health check for confirming that the system control device 11 is operating normally.

The backup system control device 21 sends a database request to the system control device 11, and when an answer cannot be obtained thereafter, it is determined that a malfunction has occurred in the transmission line 100 (c1 and c2 in FIG. 10), and a re-registration request is sent to the IP telephone terminals 22-1 to 22-n registered in the telephone terminal database unit 112 (c3 in FIG. 10).

The IP telephone terminals 22-1 to 22-n that receive the notification will initialize, clear the terminal IP address and the DHCP-acquired IP address, send a DHCP Discover, and make an IP address request to the address management device 12 (c4 in FIG. 10).

Since the IP telephone terminals 22-1 to 22-n cannot obtain a response because a malfunction has occurred in the transmission line 100, the terminals resend a DHCP Discover (c4 to c6 in FIG. 10) every 4, 8, 16, and 32 seconds, for example, and wait for a response for about 2 minutes from the first send. When the IP telephone terminals 22-1 to 22-n have not obtained a response even if about two minutes has elapsed, the terminals determine that IP address acquisition has failed.

In this case, since the IP telephone terminals 22-1 to 22-n connect to the backup system control device 21, operation can be carried out because the IP addresses (the IP address previously acquired using the DHCP from the address management device 12) saved in the IP address management unit 223 are used and registered (c9 and c10 in FIG. 10) in the telephone terminal database unit 112 of the backup system control device 21 as a result of the fact that a registration request is sent to the backup system control device 21 (c7 and c8 in FIG. 10). In this interval, the backup system control device 21 continues to periodically send a database request to the system control device 11.

When the IP telephone terminals 22-1 to 22-n fail to acquire an IP address from the address management device 12 and use the saved, previously acquired IP address, a connection request is not made to the system control device 11. This is due to the fact that when an event occurs in which only the address management device 12 continues to be down after the transmission line 100 is restored, the IP address is duplicated after the address management device 12 is restored if a registration request is sent and a connection is made to the system control device 11.

The following procedure is adopted in order to avoid duplicating IP addresses to the extent possible in the address management device 12 as well: Before an IP address is assigned to the IP telephone terminals 22-1 to 22-n, a signal (ping or the like, for example) is sent for confirming whether a terminal that uses this IP address is present on the transmission line, and address management is performed at each remote station.

Since the backup system control device 21 is no more than a backup device, when a registration request is received from the IP telephone terminals 22-1 to 22-n in a state in which a connection has been made to the system control device 11, the IP telephone terminals 22-1 to 22-n are not registered and an error is returned.

Therefore, when only the system control device 11 is down, the IP telephone terminals 22-1 to 22-n acquire an IP address from the address management device 12, and operation is carried out with a connection to the backup system control device 21. When a malfunction occurs in the transmission line 100 connecting the main station 1 and remote station 2, the IP telephone terminals 22-1 to 22-n are able to operate at the remote station 2 as a result of the fact that the IP address acquired from the previous DHCP is used to connect to the backup system control device 21.

After the transmission line 100 has been restored from a malfunction, the backup system control device 21 determines that the transmission line 100 has been restored when a response is received from the system control device 11 in response to a database request from the backup system control device 21 (d1 to d3 in FIG. 11), and a re-registration request is sent to the IP telephone terminals 22-1 to 22-n (d4 in FIG. 11). This means not only that is there a reconnection to the system control device 11, but also that an IP address is reacquired from the address management device 12.

The IP telephone terminals 22-1 to 22-n, which have received notification of a re-registration command, are initialized, a DHCP Discover is then sent (d5 in FIG. 11), and an IP address request is provided to the address management device 12. When the IP telephone terminals 22-1 to 22-n acquire an IP address from the address management device 12, the IP address and the DHCP acquired-IP address of the IP address management unit 223 are saved in the RAM, the DHCP-acquired IP address for saving is saved in the FROM, and a terminal registration request is sent to the system control device 11 by using the terminal IP address (d6 to d10 in FIG. 11).

The system control device 11 which has received the request initiates operation by registering the request in the telephone terminal database unit 112 (d11 in FIG. 11), returning an OK (d12 in FIG. 11), and completing the registration. The IP telephone terminals 22-1 to 22-n are therefore capable of again operating under the system control device 11.

Thus, in the present embodiment, the IP telephone terminals 22-1 to 22-n can connect to the backup system control device 21 located in the remote station 2 by using saved IP addresses even if a malfunction has occurred in the transmission line 100 between the main station 1 and remote station 2, by virtue of the fact that the previously IP address acquired from the address management device 12 is saved in the IP telephone terminals 22-1 to 22-n. Operation can therefore be carried out without installing a DHCP server in each remote station 2, in a system which operates by DHCP.

In the present embodiment, since a DHCP server (address management device 12) can be installed solely in the main station 1, the IP addresses of both the main station 1 and remote station 2 can be managed with a single DHCP server, and uniform management is made possible.

Figure 12:
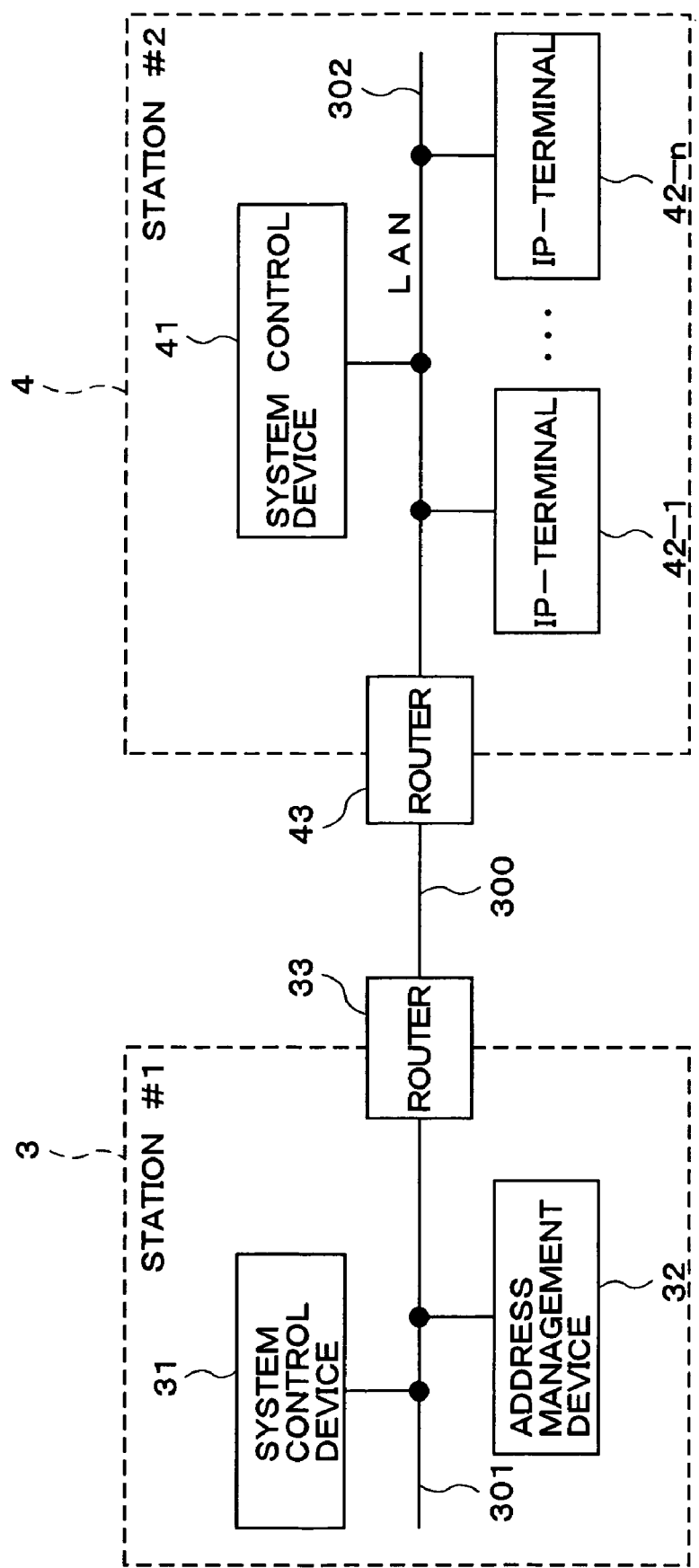
FIG. 12 is block diagram showing the configuration of the network of another embodiment of the present invention.

FIG. 12 is block diagram showing the configuration the network according to the second embodiment of the present invention. In the network according to the second embodiment, as shown in FIG. 12, the backup system control device 21 is not used as a backup as it is in the first embodiment described above, but has a system configuration that is considered to be equal to that of the system control device 11.

As shown in FIG. 12, in the network of the second embodiment, the system control device 31 and address management device 32 are connected by a transmission line 301 in station (#1) 3, and the system control device 41 and IP telephone terminals 42-1 to 42-n are connected by a LAN 302 in station (#2) 4. In this case, the IP telephone terminals 42-1 to 42-n are IP telephone terminals, PCs (Personal Computers) having IP telephone functions, PDAs (Personal Digital Assistants), or other information processing terminals.

In the network related to the second embodiment of the present invention, the IP telephone terminals 42-1 to 42-n connect to and operate in conjunction with either the system control device 31 or 41. The system control devices 31 and 41 share a terminal database (not shown), and the IP telephone terminals 42-1 to 42-n recognize which system control device 31 or 41 they are connected to.

When a malfunction occurs in the transmission line 300 for connecting the station (#1) 3 and the station (#2) 4 by way of the routers 33 and 43, the system control device 41 sends the re-registration request to the IP terminal which was connected to the system control device 31, and the IP terminal uses the previously acquired IP address to connect to the system control device 41. In this case, the IP terminal originally connected to the system control device 41 continues to operate as before, and the IP terminal connected to the system control device 31 connects to the system control device 41 and operates using the previously acquired IP address after the time limit of the IP address from the HDCP has elapsed.

After the transmission line 300 connecting the station (#1) 3 and the station (#2) 4 is restored, a re-registration request is sent to all the IP terminals connected to the system control device 41, and the IP terminals acquire an IP address from the address management device 32, connect to either the system control device 31 or 41, and return to normal operation.

Thus, the present invention is also applicable to cases in which an equivalent system control device is provided to the networks (stations) and operated without using a backup system control device as described above.

Figure 13:
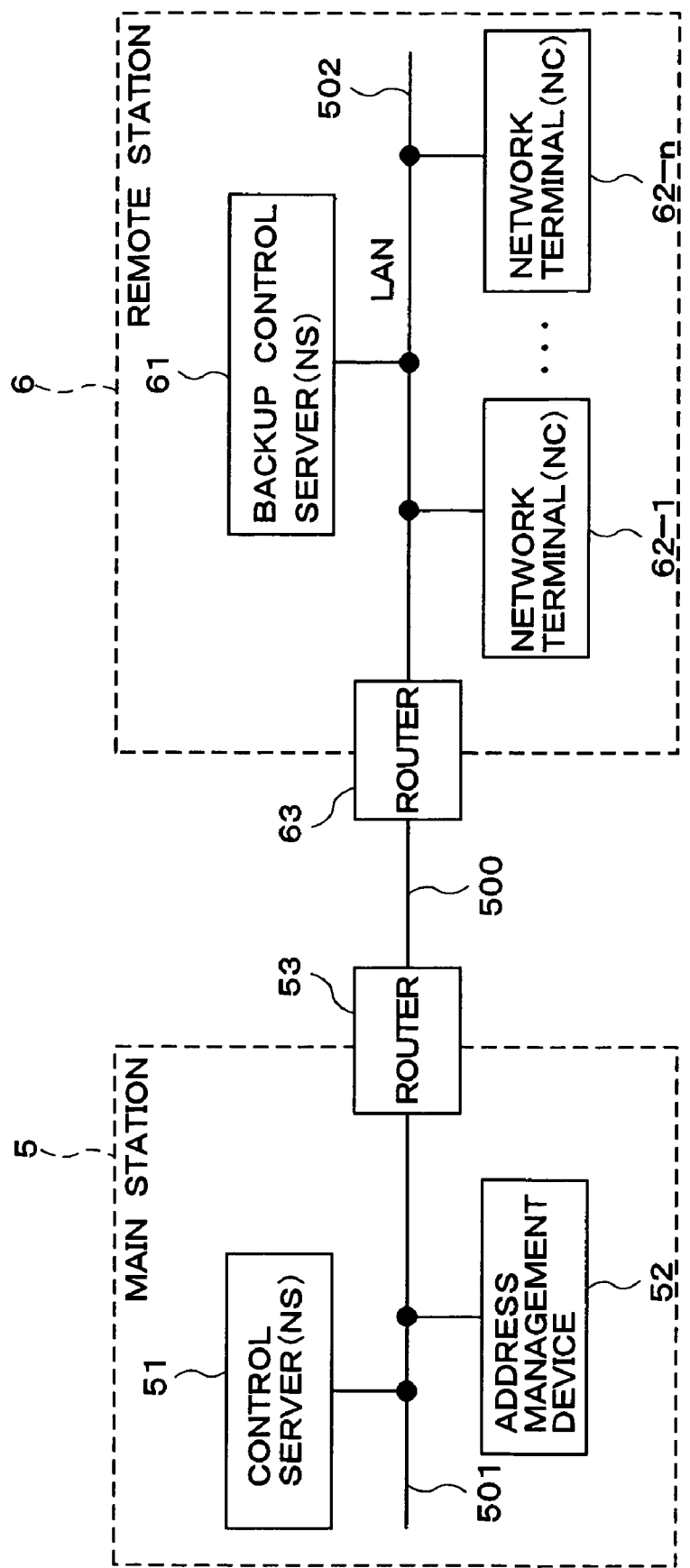
FIG. 13 is block diagram showing the configuration of the network of yet another embodiment of the present invention.

FIG. 13 is block diagram showing the configuration of the network according to the third embodiment of the present invention. In the network according to the third embodiment, as shown in FIG. 13, an address management device (having a DHCP server function) 52 and a control server (NS) 51 for controlling the IP telephone terminals 62-1 to 62-n in the main station 5 are connected by the transmission line 501, and the backup control server (NS) 61 in the remote station 6 and the network terminals (NC) 62-1 to 62-n are connected by a LAN 502.

In the network of the third embodiment, when malfunction occurs in the network 500 for connecting the main station 5 and the remote station 6 by way of routers 53 and 63, the network terminals (NC) 62-1 to 62-n use the IP address acquired from the previous address management device 52, and connect to the backup control device (NS) 61 to carry out operations.

Thus, the present invention is also applicable to the network terminals (NC) 62-1 to 62-n connected to the control server (NS) 51 of the main station 5 and to the backup control device (NS) 61 of the remote station 6.

What is claimed is:

1. A network, comprising:
a plurality of network terminal devices;
first and second system control devices which can control each of said plurality of network terminal devices; and
an address management device for managing IP (Internet Protocol) addresses of said plurality of network terminal devices, wherein
said first system control device and said address management device are connected to a first station;
said second system control device and said plurality of network terminal devices are connected to a second station;
each of said plurality of network terminal devices is connected to and operable by each of said first system control device and said second system control device; and each of said network terminal devices has a storage unit for storing an IP address acquired from said address management device, and a management unit for using the IP address stored in said storage unit when a malfunction has occurred in the connection between said first station and said second station, and re-registering the address in the system control device to which that network terminal devices are connected;

said second system control device of said second station acts as a backup system control device when said first station is a main-station and said second station is a remote station;

said address management device has a DHCP (Dynamic Host Configuration Protocol) server, and time-limited IP addresses are assigned to said plurality of network terminal devices;

each of said plurality of network terminal devices uses as a terminal IP address an IP address acquired from said DHCP server previously saved in said storage unit when said IP address could not be acquired from said DHCP server at the time of registration in said backup system control device; and each said plurality of network terminal devices connects to the second system control device of the second station other than the first station to which said DHCP server is connected when the IP addresses acquired from said DHCP server previously saved in said storage unit are used.

2. The network according to claim 1, wherein said storage unit stores an IP address acquired from said address management device prior to the occurrence of said malfunction.

3. The network according to claim 1, wherein the network terminal devices are IP telephone terminals that can connect to a LAN (Local Area Network).

4. A network, comprising:
a plurality of network terminal devices;
a system control device which can control each of said plurality of network terminal devices;
a backup system control device which can control each of said plurality of network terminal devices;
an address management device for managing IP (Internet Protocol) addresses of said plurality of network terminal devices;
an intrastation transmission line to which said system control device and said address management device are connected, thereby constituting a first station;
a LAN (Local Area Network) to which said network terminal devices and said backup system control device are connected, thereby constituting a second station; and
an interstation transmission line for connecting said first station and said second station by way of a router, wherein
said network terminal devices are connected to and operated by said system control device;
each of said network terminal devices has a storage unit for storing an address acquired from said address management device, and a management unit for using the IP address stored in said storage unit when a malfunction has occurred in the interstation transmission line between said first station and said second station, and re-registering the address in the backup system control device;
said network terminal devices are connected to and operated by said backup system control device when said malfunction has occurred in said interstation transmission line;

said storage unit stores an IP address acquired from said address management device prior to the occurrence of said malfunction;

said address management device is a DHCP (Dynamic Host Configuration Protocol) server, and time-limited IP addresses are assigned to said plurality of network terminal devices; and each of said plurality of network terminal devices uses as a terminal IP address an IP address acquired from said DHCP server previously and saved in said storage unit when said IP address could not be acquired from said DHCP server at the time of registration in said backup system control device.

5. The network according to claim 4, wherein the network terminal devices are IP telephone terminals that can connect to a LAN (Local Area Network).

6. A network, comprising:
a plurality of network terminal devices;
first and second system control devices which can control each of said plurality of network terminal devices;
an address management device for managing IP (Internet Protocol) addresses of said plurality of network terminal devices;
an intrastation transmission line to which said first system control device and said address management device are connected, thereby constituting a first station;
a LAN (Local Area Network) to which said network terminal devices and said second system control device are connected, thereby constituting a second station; and
an interstation transmission line for connecting said first station and said second station by way of a router, wherein
said network terminal devices are connected to and operated by said first system control device or said second system control device;
each of said network terminal devices has a storage unit for storing an IP address acquired from said address management device, and a management unit for using the IP address stored in said storage unit when a malfunction has occurred in the interstation transmission line connected between said first station and said second station, and re-registering the address in the second system control device;
network terminal devices which belongs to the second station and which have been connected to and operated by said first system control device prior to the occurrence of said malfunction are made connected to and operated by said second system control device after the occurrence of the malfunction when the malfunction has occurred in said interstation transmission line;
said storage unit stores an IP address acquired from said address management device prior to the occurrence of said malfunction;
said address management device is a DHCP (Dynamic Host Configuration Protocol) server, and time-limited IP addresses are assigned to said plurality of network terminal devices; and
each of said plurality of network terminal devices uses as a terminal IP address an IP address acquired from said DHCP server previously and saved in said storage unit when said IP address could not be acquired from said DHCP server at the time of registration in said second system control device.

7. The network according to claim 6, wherein said network terminal devices are IP telephone terminals that can connect to a LAN (Local Area Network).

8. A network terminal device of a network which is controlled by first and second system control devices, in which the IP (Internet Protocol) address thereof is managed by an address management device, wherein
   said network has a first station to which said first system control device and said address management device are connected, and a second station to which said second system control device and said network terminal devices are connected;
   said network terminal device is operable by each of said first system control device and or said second system control device;
   each of said network terminal device has a storage unit for storing an IP address acquired from said address management device, and a management unit for using the IP address stored in said storage unit when a malfunction has occurred in the connection between said first station and said second station, and re-registering the address in the system control device to which the network terminal device is connected;
   the system control device of said second station acts as a backup system control device when said first station is a main station and said second station is a remote station;
   said address management device is a DHCP (Dynamic Host Configuration Protocol) server, and assigns a time-limited IP address to said network terminal device;
   the IP addresses acquired from said DHCP server previously saved in said storage unit are used as terminal IP addresses when said IP address could not be acquired from said DHCP server at the time of registration in said backup system control device; and
   connection is made to the system control device of a station other than the station to which said DHCP server is connected when the IP addresses acquired from said DHCP server previously saved in said storage unit are used.

9. The network terminal device according to claim 8, wherein said storage unit stores an IP address acquired from said address management device prior to the occurrence of said malfunction.

10. The network terminal device according to claim 8, wherein the devices are IP telephone terminals that can connect to a LAN (Local Area Network).

11. A network terminal device of a network which is controlled by a system control device and a backup system control device, in which the IP (Internet Protocol) address thereof is managed by an address management device, wherein
   said network has a first station to which said system control device and said address management device are connected, a second station to which said backup system control device and said network terminal devices are connected, and an interstation transmission line for connecting said first station and said second station by way of a router;
   each of said network terminal devices has a storage unit for storing an IP address acquired from said address management device, and a management unit for using the IP address stored in said storage unit when a malfunction has occurred in the interstation transmission line that connects said first station and said second station, and re-registering the address in the backup system control device;
   said network terminal devices are connected to and operated by said system control device, and are connected to and operated by said backup system control device when a malfunction has occurred in the interstation transmission line;
   said storage unit stores an IP address acquired from said address management device prior to the occurrence of said malfunction;
   said address management device is a DHCP (Dynamic Host Configuration Protocol) server, and assigns time-limited IP addresses to said network terminal devices; and
   said network terminal device uses as a terminal IP address an IP address acquired from said DHCP server previously and saved in said storage unit when said IP address could not be acquired from said DHCP server at the time of registration in said backup system control device.

12. The network terminal device according to claim 11, wherein said network terminal device is an IP telephone terminal that can connect to a LAN (Local Area Network).

13. A network terminal device of a network which is controlled by first and second system control devices, in which the IP (Internet Protocol) address thereof is managed by an address management device, wherein
   said network has a first station to which said first system control device and said address management device are connected, a second station to which said second system control device and said network terminal device are connected, and an interstation transmission line for connecting said first station and said second station by way of a router;
   each of said network terminal device has a storage unit for storing an IP address acquired from said address management unit, and a management unit for using the IP address stored in said storage unit when a malfunction has occurred in the interstation transmission line that connects said first station and said second station, and re-registering the address in the second system control device; and
   said network terminal devices are connected to and operable by each of said first system control device and said second system control device, and
   when said malfunction has occurred in the interstation transmission line, network terminal devices which belongs to the second station and which was connected to and operated by said first system control device prior to the malfunction occurrence are made connected to and operated by said second system control device after the malfunction has occurred;
   said address management device is a DHCP (Dynamic Host Configuration Protocol) server, and time-limited IP addresses are assigned to said network terminal devices; and
   said network terminal device uses as a terminal IP address an IP address acquired from said DHCP server previously saved in said storage unit when said IP address could not be acquired from said DHCP server at the time of registration in said second system control device.

14. The network terminal devices according to claim 13, wherein said storage unit stores an IP address acquired from said address management device prior to the occurrence of said malfunction.

15. The network terminal devices according to claim 13, wherein said network terminal device is IP telephone terminals that can connect to a LAN (Local Area Network).

16. An IP address management method used in a network comprising:
   a plurality of network terminal devices;
   first and second system control devices which can control each of said plurality of network terminal devices; and an address management device for managing IP (Internet Protocol) addresses of said plurality of network terminal devices, wherein said first system control device and said address management device are connected to a first station;

said second system control device and said plurality of network terminal devices are connected to a second station; and each of said plurality of network terminal devices is connected to and operated by said first system control device or said second system control device, wherein the method comprises:

storing an IP address acquired from said address management device in the storage unit of said network terminal devices;

using the IP address stored in said storage unit when a malfunction has occurred in the connection between said first and second stations, and re-registering the address in the system control device to which the network terminal devices are connected;

said address management device is a DHCP (Dynamic Host Configuration Protocol) server, and time-limited IP addresses are assigned to said plurality of network terminal devices;

each of said plurality of network terminal devices uses as a terminal IP address an IP address acquired from said DHCP server previously saved in said storage unit when said IP address could not be acquired from said DHCP server at the time of registration in said backup system control device;

each of said plurality of network terminal devices connects to the second System control device of the second station other than the first station to which said DHCP server is connected when the IP addresses acquired from said DHCP server previously saved in said storage unit are used.

17. The IP address management method according to claim 16, wherein said storage unit stores an IP address acquired from said address management device prior to the occurrence of said malfunction.

18. The IP address management method according to claim 16, wherein the system control device of said second station acts as a backup system control device when said first station is a main station and said second station is a remote station.

19. The IP address management method according to claim 16, wherein the network terminal devices are IP telephone terminals that can connect to a LAN (Local Area Network).

20. An IP address management method used in a network comprising:

a plurality of network terminal devices;

a system control device which can control each of said plurality of network terminal devices;

a backup system control device which can control each of said plurality of network terminal devices;

an address management device for managing IP (Internet Protocol) addresses of said plurality of network terminal devices;

an intrastation transmission line to which said system control device and said address management device are connected, thereby constituting a first station;

a LAN (Local Area Network) to which said network terminal devices and said backup system control device are connected, thereby constituting a second station; and an interstation transmission line for connecting said first station and said second station by way of a router, wherein the method comprises:

storing an IP address acquired from said address management device in the storage unit of said network terminal devices; and using the IP address stored in said storage unit when a malfunction has occurred in the interstation transmission line, and re-registering the address in said backup system control device, wherein said network terminal devices are connected to and operated by said system control device, mad said network terminal devices are connected to and operated by said backup system control device when said malfunction has occurred in said interstation transmission line;

said address management device is a DHCP (Dynamic Host Configuration Protocol) server, and time-limited IP addresses are assigned to said plurality of network terminal devices;

said plurality of network terminal devices uses as a terminal IP address an IP address acquired from said DHCP server previously and saved in said storage unit when said IP address could not be acquired from said DHCP server at the time of registration in said backup system control device.

21. The IP address management method according to claim 20, wherein said storage unit stores an IP address acquired from said address management device prior to the occurrence of said malfunction.

22. The IP address management method according to claim 20, wherein the network terminal devices are IP telephone terminals that can connect to a LAN (Local Area Network).

23. An IP address management method used in a network comprising:

a plurality of network terminal devices;

first and second system control devices which can control each of said plurality of network terminal devices;

an address management device for managing IP (Internet Protocol) addresses of said plurality of network terminal devices;

an intrastation transmission line to which said first system control device and said address management device are connected, thereby constituting a first station; a LAN (Local Area Network) to which said network terminal devices and said second system control device are connected, thereby constituting a second station; and an interstation transmission line for connecting said first station and said second station by way of a router, wherein the method comprises:

storing an IP address acquired from said address management device in the storage unit of said network terminal devices; and using the IP address stored in said storage unit when a malfunction has occurred in the interstation transmission line, and re-registering the address in said second system control device, wherein said network terminal devices are connected to and operated by said first system control device or second system control device, and network terminal devices which belongs to the second station and which were connected to and operated by said first system control device prior to the occurrence of said malfunction are made connected to and operated by said second system control device after the occurrence of the malfunction when the malfunction has occurred in said interstation transmission line;

said address management device is a DHCP (Dynamic Host Configuration Protocol) server, and time-limited IP addresses are assigned to said plurality of network terminal devices;

each of said plurality of network terminal devices uses as a terminal IP address an IP address acquired from said DHCP server previously saved in said storage unit when said IP address could not be acquired from said DHCP server at the time of registration in said second system control device.

24. The IP address management method according to claim 23, wherein said storage unit stores an IP address acquired from said address management device prior to the occurrence of said malfunction.

* * * * *